United States Patent
Knizek

(10) Patent No.: US 11,206,151 B2
(45) Date of Patent: Dec. 21, 2021

(54) METHOD AND SYSTEM FOR CONTROLLING A HOME APPLIANCE DEPENDING ON A USER POSITION

(71) Applicant: TADO GMBH, Munich (DE)

(72) Inventor: Michal Knizek, Munich (DE)

(73) Assignee: TADO GMBH, Munich (DE)

( * ) Notice: Subject to any disclaimer, the term of this patent is extended or adjusted under 35 U.S.C. 154(b) by 29 days.

(21) Appl. No.: 15/763,187

(22) PCT Filed: Sep. 21, 2016

(86) PCT No.: PCT/EP2016/001579
§ 371 (c)(1),
(2) Date: Mar. 26, 2018

(87) PCT Pub. No.: WO2017/054909
PCT Pub. Date: Apr. 6, 2017

(65) Prior Publication Data
US 2018/0219696 A1    Aug. 2, 2018

(30) Foreign Application Priority Data
Sep. 28, 2015  (GB) ...................... 1517116

(51) Int. Cl.
*H04L 12/28* (2006.01)
*H04W 4/029* (2018.01)
(Continued)

(52) U.S. Cl.
CPC .......... *H04L 12/2816* (2013.01); *G06F 21/10* (2013.01); *G08C 17/02* (2013.01);
(Continued)

(58) Field of Classification Search
CPC ............. H04L 12/2816; H04L 12/2838; H04L 2012/2841; H04L 12/2809; H04L 67/24;
(Continued)

(56) References Cited

U.S. PATENT DOCUMENTS

2008/0066123 A1    3/2008  Igoe et al.
2008/0143516 A1*   6/2008  Mock ................. G08B 13/1427
                                                     340/539.14
(Continued)

OTHER PUBLICATIONS

Liu et al., "Building a validation measure for activity-based transportation models based on mobile phone date" Expert Systems with Applications, vol. 41, Elsevier Science Ltd., Oct. 2015, 30 pages.
(Continued)

*Primary Examiner* — Kenneth M Lo
*Assistant Examiner* — Mohammed Shafayet
(74) *Attorney, Agent, or Firm* — Hoffman Warnick LLC

(57) ABSTRACT

Aspects relate to a method for controlling a home appliance depending on a user position, along with a related system. The method includes: determining a position of a smartphone of a user; transmitting positional information on the determined position from the smartphone to a remote server; judging from the positional information whether the determined position is within or outside a predefined home zone surrounding the home appliance; generating a control signal dependent on whether the determined position is within or outside the home zone; transmitting the control signal to a control device to control the home appliance; judging from the positional information whether the determined position is within a predefined problematic zone which is outside the home zone; and reclassifying the determined position to be within the home zone or ignoring the determined position depending on at least whether the determined position is within the problematic zone.

10 Claims, 2 Drawing Sheets

(51) Int. Cl.
*H04W 4/021* (2018.01)
*H04W 4/02* (2018.01)
*G05B 13/02* (2006.01)
*G08C 17/02* (2006.01)
*G06F 21/10* (2013.01)
*H04W 4/33* (2018.01)

(52) U.S. Cl.
CPC ...... *H04L 12/2809* (2013.01); *H04L 12/2838* (2013.01); *H04W 4/02* (2013.01); *H04W 4/021* (2013.01); *H04W 4/029* (2018.02); G05B 13/0205 (2013.01); G06F 2221/2111 (2013.01); G08C 2201/91 (2013.01); G08C 2201/93 (2013.01); H04L 2012/2841 (2013.01); *H04W 4/023* (2013.01); *H04W 4/33* (2018.02)

(58) Field of Classification Search
CPC .. H04L 67/125; H04L 12/2818; H04W 4/021; H04W 4/02; H04W 4/029; H04W 4/33; H04W 4/04; H04W 4/023; G06F 21/10; G06F 2221/2111; G08C 2201/91; G08C 2201/93; G08C 17/02; G01S 5/02; Y02B 70/3275; Y02B 30/00; Y02B 20/48; Y02B 20/44; Y02B 20/40; Y02B 70/30; H04M 11/007; G05D 23/1905; G05B 13/0205
USPC ............................................................ 700/1
See application file for complete search history.

(56) References Cited

U.S. PATENT DOCUMENTS

| | | | | |
|---|---|---|---|---|
| 2008/0195702 A1* | 8/2008 | Matz | ................... | H04W 4/023 709/204 |
| 2009/0009397 A1* | 1/2009 | Taylor | ................ | G01C 21/206 342/451 |
| 2010/0141432 A1* | 6/2010 | Sugla | ................... | G01S 5/0294 340/539.13 |
| 2011/0279323 A1* | 11/2011 | Hung | ..................... | G01S 19/34 342/451 |
| 2011/0298615 A1* | 12/2011 | Rich | ..................... | A01K 27/001 340/539.13 |
| 2013/0013757 A1 | 1/2013 | Millington et al. | | |
| 2013/0180468 A1* | 7/2013 | Dutcher | ................ | H04W 4/021 119/721 |
| 2013/0339891 A1* | 12/2013 | Blumenberg | .......... | G01C 21/26 715/771 |
| 2013/0345965 A1* | 12/2013 | Kirmse | ................. | H04W 4/023 701/422 |
| 2014/0171099 A1* | 6/2014 | Sydir | .................... | H04W 4/029 455/456.1 |
| 2014/0172176 A1* | 6/2014 | Deilmann | ........... | H04L 12/2827 700/275 |
| 2014/0369231 A1 | 12/2014 | Chen et al. | | |
| 2014/0370911 A1* | 12/2014 | Gorgenyi | .............. | H04W 4/022 455/456.1 |
| 2015/0081212 A1* | 3/2015 | Mitchell | .............. | G01C 21/367 701/454 |
| 2015/0095774 A1 | 4/2015 | Bates et al. | | |
| 2015/0105944 A1* | 4/2015 | Louboutin | ............ | H04W 4/021 701/2 |
| 2015/0163631 A1* | 6/2015 | Quam | ................... | H04L 67/025 455/456.1 |
| 2015/0173037 A1* | 6/2015 | Pijl | ....................... | A61B 5/1117 455/456.1 |
| 2015/0248797 A1* | 9/2015 | Duggan | .............. | G07C 9/00111 340/8.1 |
| 2015/0309483 A1* | 10/2015 | Lyman | ................... | G05B 15/02 700/275 |
| 2015/0310490 A1* | 10/2015 | Meredith | .............. | H04W 4/021 705/14.58 |
| 2015/0365799 A1* | 12/2015 | Sheha | .................... | G01C 21/20 455/456.3 |
| 2017/0048665 A1* | 2/2017 | Yocam | .................. | H04W 4/021 |

OTHER PUBLICATIONS

PCT/EP2016/067388, International Search Report, dated Dec. 7, 2016, 4 pages.

* cited by examiner

METHOD AND SYSTEM FOR CONTROLLING A HOME APPLIANCE DEPENDING ON A USER POSITION

TECHNICAL FIELD

The present invention relates to a method for controlling a home appliance depending on a user position, and to a system for controlling a home appliance depending on a user position.

BACKGROUND

In the last years, great efforts have been taken to envisage intelligent ways to control home appliances. In particular, it is desirable to control certain home appliances depending on whether or not a person is at home, i.e., near the home appliance. For instance, the home appliance may be a heating system. If the heating system can be controlled to heat an environment to a comparably high temperature only when a person is at home, this may substantially reduce heating costs. A similar case in point is an air conditioning which may preferably only be activated if a person is in the same room or building as this home appliance.

This topic is addressed in a generic method for controlling a home appliance depending on a user position. Such a method comprises:
determining a position of a smartphone of a user;
transmitting positional information on the determined position from the smartphone to a remote server;
judging from the positional information whether the determined position is within or outside a predefined home zone surrounding the home appliance;
generating a control signal dependent on whether the determined position is judged to be within or outside the home zone; and
transmitting the control signal (in particular from the remote server) to a control device configured to control the home appliance.

Similarly, a generic system for controlling a home appliance depending on a user position comprises a remote server which is configured to:
judge from received positional information on a determined position of a smartphone whether the determined position is within or outside a predefined home zone surrounding the home appliance;
generate a control signal dependent on whether the determined position is judged to be within or outside the home zone; and
transmitting the control signal to a control device configured to control the home appliance according to the control signal.

A related method and a corresponding system are described in Applicant's German Patent application No. DE 10 2011 052 467 A1, and in US 2010/0127854. The method and system rely on the possibilities to localize a smartphone which serves as an indicator of a person's position.

This procedure may work well as long as the smartphone position is ascertained correctly with a great accuracy.

However, this is not always the case.

The position may be determined based on one or more of: GPS information, information on nearby wireless networks, in particular WiFi (WLAN) networks, Bluetooth connection information or other short range wireless communication information, and cellular network connection information. Information on the determined position may be provided in the form of a so called geofix or geolocation fix, which may include values of a determined latitude, longitude, altitude, accuracy, speed and its direction. Especially if only mobile network connection information is available, the quality of the position determination may be poor. This problem is exacerbated if an accuracy provided in the geolocation fix falsely indicates a high accuracy of the rather erroneously determined position.

It may thus happen that a conventional method and system incorrectly assume a user had left the home zone and control the home appliance accordingly. For example, a heating or air conditioning may be turned off as a user is incorrectly assumed to have left the respective room or building.

SUMMARY OF THE INVENTION

The present disclosure addresses the problem of providing a method and a system that allow controlling a home appliance based on a user position with a particularly good reliability.

This problem is solved with a method and a system disclosed herein.

Preferred embodiments of the invention are defined in the dependent claims and the following description.

The generic method described above comprises, according to the invention, the following additional steps:
judging from the transmitted positional information whether the determined position is within a predefined problematic zone which is outside the home zone; and
modifying the determined position depending on at least the criterion whether the determined position is judged to be within the problematic zone.

The determined position is thus modified if the determined position is judged to be within the problematic zone or if this criterion and further criteria are met. The modifying may include reclassifying the determined position to be within the home zone or alternatively ignoring the determined position. Hence, control signals generated may be the same for a case in which the determined position is reclassified to be within the home zone as for the case that the determined position is judged to be in the home zone in the first place. The modifying may also include the procedure that the last trusted determined position is used, e.g. the last/latest determined position that is judged to be outside the problematic zone. In effect, this may mean that modifying the determined position means to ignore these data or to generate control signals similarly as if the immediate preceding position before a position in the problematic zone were determined.

The generic system defined above is, according to the invention, characterized in that the remote server is further configured to:
judge from the transmitted positional information whether the determined position is within a predefined problematic zone which is outside the home zone; and
modify the determined position depending on at least the criterion whether the determined position is judged to be within the problematic zone.

In particular, this may mean to reclassify the determined position to be within the home zone or ignoring the determined position depending on at least whether or not the determined position is judged to be within the problematic zone.

The inventors have realized that false positional information may in particularly be caused by determining the smartphone position only via cellular network connections. In that case a connection from one cell tower may be switched to a connection to another cell tower without the smartphone user having moved. However, a determined position of the smartphone may be adversely affected by this connection switching. It has been found that the determined position does not randomly jump to any false position but rather to one defined area. This area may depend on the involved cell tower(s) and their positions. In particular such an area may be referred to as a problematic zone. The invention makes use of the finding that false determined positions are not randomly distributed around a correct position but very often fall into the problematic zone.

As an idea of the invention, a person is not automatically (i.e. not always) assumed to have left the home zone if the determined position is found to be inside the problematic zone. Instead, such a determined position may be modified, in particular either ignored (in which case a control signal may only be generated based on a next determined position that is outside the problematic zone) or the determined position may be reclassified to be within the home zone. This accounts for the case that a user remains within the home zone but consecutive determined positions change from the home zone to the problematic zone, often back and forth. The reclassification is particularly suitable as it has been found that a smartphone position being falsely determined in the problematic zone occurs more often if the smartphone is actually in the home zone and not at another position outside the home zone. One reason may be that smartphone users often turn off the WiFi and GPS activities of their smartphones for bed time and hence the problems of jumps to the problematic zone occur more often when the smartphone user is asleep and hence in his home zone.

It is desirable to separate a case in which the smartphone user is in his home zone and then a presumably false jump to the problematic zone occurs from a case in which the smartphone user is on the move outside the home zone and may very well enter the problematic zone (i.e., a position is correctly determined to be within the problematic zone). This separation can be achieved if the modifying, in particular the reclassifying or ignoring, of the determined position also depends on whether a preceding determined position is judged to be within the home zone. In particular, the determined position may only be modified if the preceding determined position is judged or reclassified to be within the home zone but not if the preceding determined position is judged or reclassified to be outside the home zone. This may constitute a further criterion that has to be met in order to perform the modifying, i.e., if this criterion is not met, the modifying is not executed.

The preceding determined position may be the directly preceding determined position or the last determined position that was outside the problematic zone. The modifying or reclassification may be carried out dependent on only one preceding determined position or dependent on several preceding determined positions. In the latter case, the modifying or reclassification may only be carried out if the considered preceding determined position(s) is/are judged to be within the home zone. If, on the other hand, the preceding determined position(s) is/are outside the home zone, the determined position in the problematic zone is not altered and handled as a position outside the home zone.

In general, the remote server may be any computational device configured to receive positional information, calculate a control signal therefrom, and transmit the control signal to a control device for controlling the home appliance. It may be preferable that the remote server is a computational unit capable of communicating with the smartphone and the control device via an internet connection. The remote server is thus able to control home appliances of many different users. It follows that the remote server may preferably not be located in the building of the home appliance but at a remote building.

In principle, all method steps described herein (such as judging whether the determined position in within the home zone, modifying the determined position/reclassifying the determined position to be within the home zone instead of the problematic zone, generating and transmitting a control signal) may be carried out by the smartphone, in particular program code (an app) saved on the smartphone. The transmission of the positional information to the remote server may then serve other objects. However, it may be preferred if at least the above recited method steps are carried out by the remote server. This allows easier software improvements, as well as better supervision and control by a service team.

The home appliance may in general be any electrical device for which a control depending on a user presence may be desired. This is in particular the case if the home appliance is a HVAC device (heating, ventilation and/or air conditioning device).

Said control signals that depend on whether the determined position is judged to be within or outside the home zone may be of such a kind that a power demand of the home appliance is controlled depending on the user position. For instance, a power demand may be increased (such as stronger heating or cooling of an HVAC device) if a person is at home, whereas the power demand may be decreased if the user is away, leading to less heating or cooling of the empty room/building in which the HVAC device is located.

The control device may in principle be any device configured to control the home appliance according to received control signals, and being configured to, or connected to, another device that is configured to receive control signals via an internet connection.

The home zone may be understood as a region including the position of the home appliance, including in particular the room, apartment or building in which the home appliance is located. The size of the home zone may be predefined based on an accuracy of typical positional information. If the home zone has a radius of, e.g., up to 20 meters or 50 meters, this can compensate for typical inaccuracies of the determined distances.

However, the problems underlying the invention cannot be solved in a desirable way by simply enlarging the home zone. The reason being that enlarging the radius of the home zone to include the area of the problematic zone would lead to the inclusion of other large areas for which the above described jumps (possibly due to connection switches between different cell towers) do not occur. Hence, this would deteriorate the accuracy of the position-dependent control.

Furthermore, simply handling the problematic zone as a (second) home zone would not account for the fact that a user may indeed have left the building of the home appliance and may have moved to the problematic zone. A differentiation between these cases only becomes possible if the previous determined position (which is either within our outside the home zone) is considered.

It may be preferable to set the problematic zone not to directly border or overlap the home zone. The determined position is then only modified, in particular reclassified or ignored, if a jump in determined positions from the home zone to the problematic zone is determined. A "jump" means that the determined position lies in the problematic zone whereas a directly preceding determined position is judged to be within the home zone, with no position being determined in the region between the home zone and the problematic zone. These characteristics help in ascertaining those cases in which a position is indeed wrongly determined in the problematic zone.

Further improvements may be achieved if the reclassifying or ignoring also depends on following positional information regarding a following determined position of the smartphone.

For reducing the risk of a false reclassification, it may further be considered that jumps to the problematic zone are usually caused by a localization on the basis of mobile/cellular network connections; however, a localization based on a GPS signal or connection to a known WiFi network does usually not lead to a false jump to the problematic zone. Hence, the modifying, in particular the reclassifying or ignoring, may only be carried out if the position of the smartphone is determined without usage of GPS signals and/or WiFi signals and/or Bluetooth communications.

The modifying may also depend on a daytime or a daytime dependent operating mode. In particular, the modifying may be carried out only if or depending on whether or not a night mode of controlling the home appliance is set. The night mode may indicate that all smartphone users went to bed, and may depend on their smartphone activity, the daytime, sounds recorded by the smartphone, and/or determined positions of the smartphone(s). These embodiments account for the fact that a smartphone user very unlikely moves from the home zone to the problematic zone during the night mode (i.e., while he is presumably asleep). A false reclassification can thus most likely be avoided.

Setting of the problematic zone may be carried out by considering former determined positions. In particular, the problematic zone may be set to include an area if, or depending on whether or not, at least one jump in a former determined position of the smartphone from the home zone to said area has been recorded. A further criterion may again be whether this jump occurred during a night operating mode of controlling the home appliance. Other criterions may be that a predefined number of jumps from the home zone to said area occurred, and/or a certain number of consecutive jumps back and forth between the home zone and said area.

The problematic zone may be set automatically or manually in the above way. If the problematic zone is set manually, provision may be made for: displaying a map showing the home zone and former determined positions, and providing a tool with which an area on the map can be defined as the problematic zone. Furthermore, connection lines between successive determined positions may be displayed, and/or only certain former determined positions may be displayed depending on a daytime of their recording and/or an operating mode of controlling the appliance during which they were recorded. This facilitates visual assessment of the displayed data.

The problematic zone may be formed as a connected space or as several subsets that are separated and distanced from each other.

Control signals transmitted when a determined position is judged to be within the home zone may be such that the home appliance is run in a first operation mode (referred to as a home operation mode). The reclassifying of the determined position to be within the home zone may be regarded equivalent to the method step of generating and transmitting such control signals that the home operation mode is maintained even though the smartphone position is determined in the problematic zone outside the home zone. In contrast, for all other determined positions outside the home zone and which are not reclassified, control signals are generated and transmitted to run the home appliance in another operation mode (referred to as an absence operation mode) which may constitute a power saving mode.

The step of reclassifying of the determined position described with respect to several embodiments may also be replaced by a step of ignoring the determined position (i.e., no change in operating mode of the home appliance occurs), and vice versa.

The described method steps shall also be seen as features of the inventive system. In particular, the remote server may be configured to carry out these steps.

A better understanding of the invention and various other features and advantages of the invention will become readily apparent by the following description in connection with the schematic drawing, which is shown by way of example only, and not limitation.

DETAILED DESCRIPTION OF THE DRAWINGS

Figure 1:
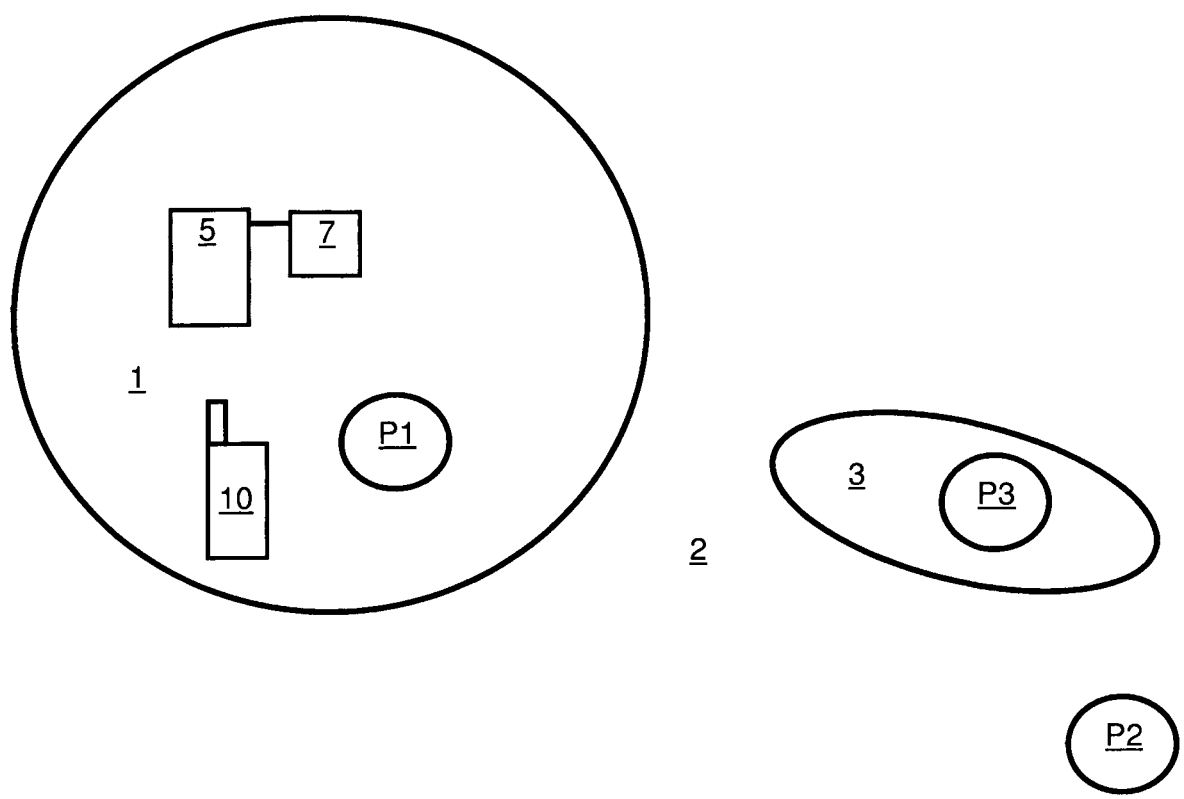
FIG. 1: shows a diagram for illustrating an embodiment of the method of the invention.

FIG. 1 depicts schematically a home appliance 5 that is controlled with a control device 7.

The home appliance 5 shall be controlled dependent on the position of a person, referred to as user position.

For example, the home appliance 5 may be a heating or air conditioning device. In order to avoid unnecessary costs, it may be desirable to run the heating or air conditioning with lower power consumption if the user is away, and with another, usually higher, power consumption if the user is close to the home appliance, for instance, in the same room or building.

To this end, a user position is measured and it is ascertained whether this position is within a home zone 1 surrounding and including the position of the home appliance 5.

The user position is derived as a position of a smartphone 10 of the user. The built-in functions of the smartphone 10 may be used for determining the smartphone position. These functions are generally known and thus a detailed description is omitted. The functions may in particular comprise one or a combination of: GPS ocalization, localization through WiFi network detection, and/or localization through mobile/cellular network connections.

The smartphone 10 gathers positional information on its detected position. This information may include a longitude and latitude value, amongst others.

The positional information is then sent to a remote server (not shown). The remote server judges whether the detected position is within the home zone 1.

For instance, the smartphone 10 as depicted may be localized at a position P1 within the home zone 1. The remote server will then judge that the position P1 is within the home zone 1. As a consequence, the remote server will generate a control signal for controlling the home appliance 5 to be run in a "home operation mode". The control signal will be sent to the control device 7 which controls the home appliance 5 according to received control signals.

An area surrounding and outside of the home zone 1 is referred to with the reference sign 2. When the smartphone user leaves the home zone 1, his position may be detected at position P2. In this case, the remote server will judge that the detected smartphone position P2 is outside the home zone 1. The remote server will then switch to generating a control signal for running the home appliance 5 in an "absence operation mode". This operation mode may constitute a power save mode in which, e.g., a heating power of a heating 5 is reduced or a cooling power of an air conditioning 5 is reduced.

This procedure works well as long as the user position is determined with a sufficient accuracy. However, problems may arise especially when the smartphone position is determined (only) based on its connections to cell towers. In particular, a connection with one cell tower may be changed to a connection with another cell tower, without the smartphone user having moved. This, however, affects the determined position. While the smartphone user stays within his home zone 1, it may thus occur that the smartphone position is determined at position P1 at one time and at position P3 at another time. Without further actions, this would lead to the remote server running the home appliance 5 in the absence operation mode, which is not desirable.

This problem is overcome with characteristics of the invention. In the case that a true smartphone position is within the home zone, it has been found that falsely determined positions are limited to a certain area. This area is labelled a problematic zone and indicated with reference sign 3 in the drawing. A determined position P3 within the problematic zone 3 may likely be due to an inaccurate position determination.

According to the invention, a determined position P3 within the problematic zone 3 is not always regarded as the smartphone position truly being outside the home zone 1. Instead, a preceding determined position is taken into account.

If the preceding determined position is a position P1 within the home zone 1, then it is likely that the smartphone user has not left the home zone 1 and has not entered the problematic zone 3. Therefore, the remote server will continue to run the home appliance 5 in the "home operation mode", i.e., the remote server will reclassify the determined position P3 to be regarded as a position within the home zone 1, or the remote server will ignore this determined position P3. In other words, the determined position is modified if it is determined to be in the problematic zone 3.

However, if the preceding determined position is a position P2 outside the home zone 1 and outside the problematic zone 3, it is likely that the smartphone user is on the move and is presently not within the home zone 1. Therefore, the remote server will run the home appliance 5 in the "absence operation mode", i.e., the remote server will not reclassify the determined position P3 to be regarded as being within the home zone 1, and will not ignore this determined position P3. This may be tantamount to modifying the determined position such that the latest determined position outside the problematic zone 3 is used as a user position, and the "absence operation mode" may be continued in the present example.

In this way, the risk of falsely assuming the smartphone user had left the home zone 1 can be greatly reduced.

The problematic zone 3 is predefined and may be determined considering former determined positions that were rated as erroneously determined positions. The rating may, in principle, be carried out automatically or manually.

The control method of some aspects of the invention advantageously minimizes false assumptions regarding the presence of a user in a home zone. A home appliance can thus be controlled automatically substantially without loss of comfort to the user. One consequence may be a considerable reduction is energy, heating and/or cooling costs.

Figure 2:
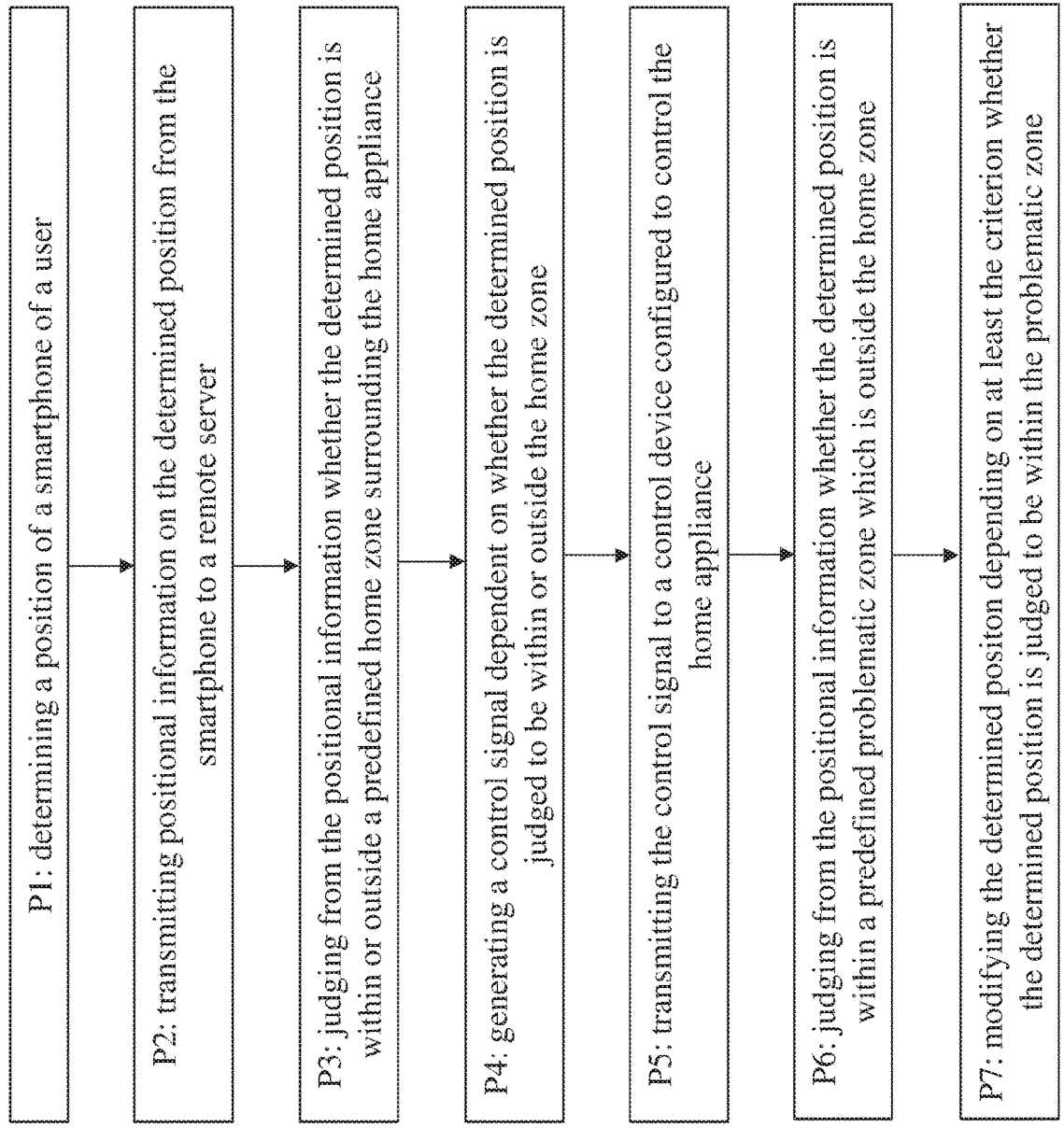
FIG. 2: shows a flow diagram for illustrating processes in a method of the invention.

FIG. 2 illustrates processes in a method described according to various aspects herein, and illustrates the following:
P1: determining a position of a smartphone of a user;
P2: transmitting positional information on the determined position from the smartphone to a remote server;
P3: judging from the positional information whether the determined position is within or outside a predefined home zone surrounding the home appliance;
P4: generating a control signal dependent on whether the determined position is judged to be within or outside the home zone;
P5: transmitting the control signal to a control device configured to control the home appliance;
P6: judging from the positional information whether the determined position is within a predefined problematic zone which is outside the home zone; and
P7: modifying the determined position depending on at least the criterion whether the determined position is judged to be within the problematic zone.

The invention claimed is:

1. A method for controlling a home appliance depending on a user position, the method comprising:
determining a position of a smartphone of a user;
transmitting positional information on the determined position from the smartphone to a remote server;
judging from the positional information whether the determined position is within or outside a predefined home zone surrounding the home appliance;
generating a control signal dependent on whether the determined position is judged to be within or outside the home zone;
transmitting the control signal to a control device configured to control the home appliance;
modifying the determined position based on the positional information indicating a jump from a directly preceding determined position within the home zone to a non-neighboring zone,
wherein modifying includes one of: reclassifying the determined position to be within the home zone, or ignoring the determined position, and
wherein the jump indicates that the determined position lies in the non-neighboring zone such that the determined position is erroneously determined in the non-neighboring zone.

2. The method of claim 1, wherein the determined position is only modified if the preceding determined position is judged to be within the home zone but not if the preceding determined position is judged to be outside the home zone.

3. The method of claim 1, wherein the modifying depends also on a daytime or a daytime dependent operating mode.

4. The method of claim 1, wherein the non-neighboring zone is set to include an area if, or depending on whether or not, at least one jump in a former determined position from the home zone to said area has been recorded, in particular during a night operating mode of controlling the home appliance.

5. The method of claim 1, wherein for manually setting the non-neighboring zone, the method comprises:
displaying a map showing the home zone and former determined positions, and
providing a tool with which an area on the map can be defined as the non-neighboring zone.

6. The method of claim 1, wherein the home appliance is a HVAC device, in particular a heating and/or air conditioning system, and the control signal is such that a power demand of the HVAC device is controlled depending on the user position.

7. The method of claim 1, wherein the non-neighboring zone comprises an area including or next to a cell tower.

8. The method of claim 1, wherein the non-neighboring zone comprises a zone that is not directly next to the predefined home zone.

9. A system for controlling a home appliance depending on a user position, the system comprising:
 a remote server configured to:
   judge from received positional information on a determined position of a smartphone whether the determined position is within or outside a predefined home zone surrounding the home appliance;
   generate a control signal dependent on whether the determined position is judged to be within or outside the home zone;
   transmit the control signal to a control device for controlling the home appliance; and
   modify the determined position based on the positional information indicating a jump from a directly preceding determined position within the home zone to a non-neighboring zone,
     wherein modifying includes one of: reclassifying the determined position to be within the home zone, or ignoring the determined position, and
     wherein the jump indicates that the determined position lies in the non-neighboring zone such that the determined position is erroneously determined in the non-neighboring zone.

10. The system of claim 9, wherein the non-neighboring zone comprises a zone that is not directly next to the predefined home zone.

\* \* \* \* \*